Sept. 12, 1961  R. E. DAVIS  2,999,781
METHOD OF DELAMINATING LAMINATED GLASS STRUCTURES
Filed Dec. 1, 1959
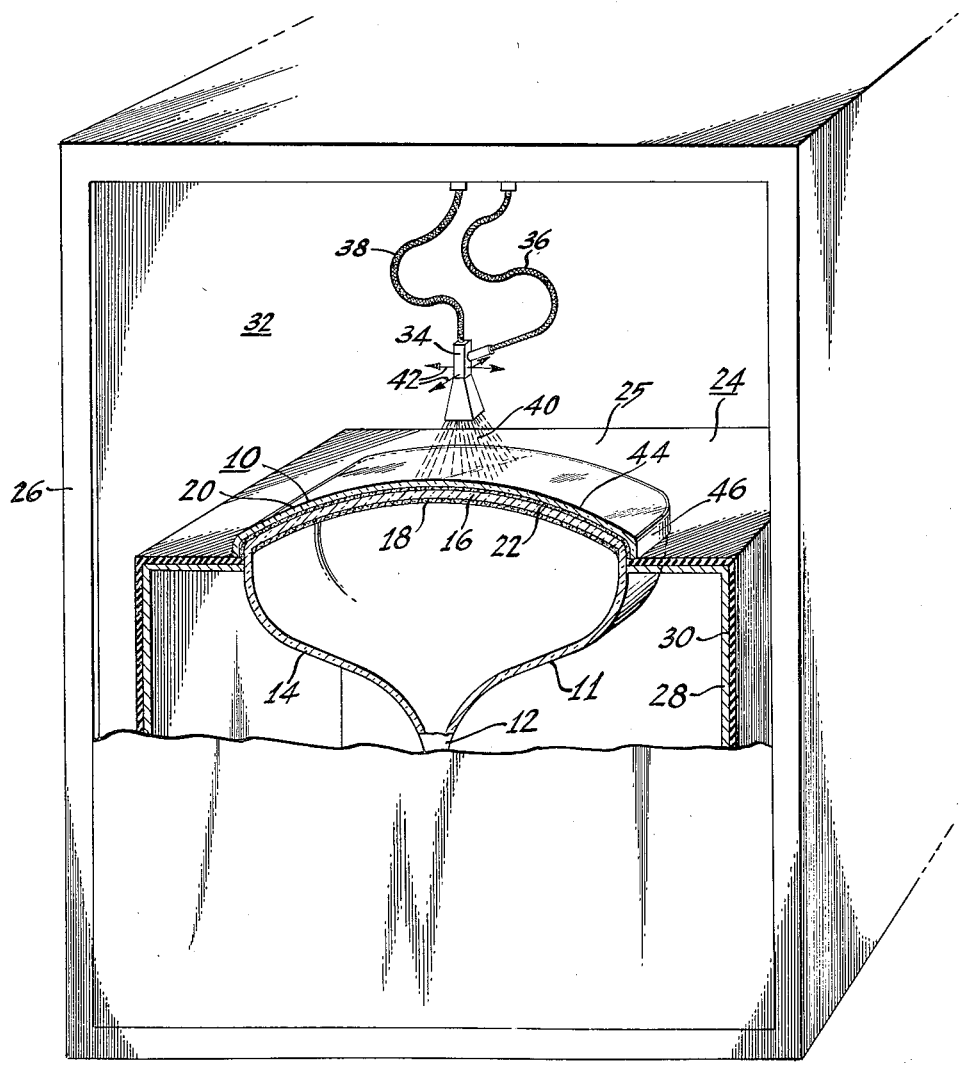
INVENTOR.
RALPH E. DAVIS
BY
William A. Zalesak
ATTORNEY ём
United States Patent Office 2,999,781
Patented Sept. 12, 1961

2,999,781
METHOD OF DELAMINATING LAMINATED GLASS STRUCTURES
Ralph E. Davis, Marion, Ind., assignor to Radio Corporation of America, a corporation of Delaware
Filed Dec. 1, 1959, Ser. No. 856,490
2 Claims. (Cl. 154—120)

This invention relates to a method of delaminating laminated glass structures and particularly to a method of salvaging glass bulb cathode ray tubes whose faceplate has previously been externally covered with a separate glass cap bonded thereto.

It is known to bond a glass cap externally to and over the faceplate of a cathode ray tube. Such a capped or laminated tube construction serves to protect the viewer from flying glass fragments in the event of an implosion of the tube. According to known practices, such laminated cathode ray tube bulbs usually comprise a glass cap which is shaped to mate with the faceplate portion of the tube envelope, and which is bonded to the faceplate by an interlayer of a suitable bonding material, such as an epoxy resin.

In fabricating such laminated cathode ray tube bulbs, an imperfect laminating thereof occasionally results. This may, for example, be due to too much or too little resin in the bonding interlayer, or to flecks of dirt, bubbles, striations, or the like in the bonding interlayer. Except for the faulty lamination, the tube may be otherwise perfectly good. Thus, it is desirable to be able to salvage such a tube by delaminating it. Moreover, it is most desirable that this be done without damaging the tube proper, e.g., damage such as might result from opening it to the atmosphere and thus losing its vacuum. If the tube can be successfully delaminated without injury thereto, it can then be simply recapped without any other additional processing.

It is also sometimes desired to delaminate a cathode ray tube bulb for the purpose of rebuiding the tube. In such an operation the tube is usually opened to the atmosphere and the electron gun removed. If the old phosphor screen is still good, it may be left in the tube. On the other hand, if the old screen is not suitable for some reason it will, at this point, be removed and a new phosphor screen deposited in its place. In either case the tube is then subjected to a lehr bake out, a new gun is inserted into the tube, and the tube is exhausted during a heating thereof and sealed off. Any such bake out or heating would destroy the lamination of the cap on the faceplate, since the bonding resin will not withstand the temperatures to which the tube is thereby subjected. Thus, even in the rebuilding of tubes, the cap must be removed and the tube recapped.

According to the prior art, such a tube has heretofore been decapped or delaminated by heating the tube to soften the bonding resin and then removing the cap and cleaning up the resin residue on the bulb. To practice this technique however, it is necessary to first open the tube to the atmosphere in order to remove the vacuum. When a tube is heated to bake it out, its glass bulb is temporarily weakened, and thus if the tube is not first de-evacuated it may possibly implode. Furthermore, if a sealed-off tube were sufficiently heated to soften the resin interlayer, occluded gases would be driven from the interior wall of the bulb which would require a considerable portion of the tube's getter to absorb them. Also, such gases might possibly "poison" the cathode, thus resulting in drastically reduced tube life. Moreover, present delaminating techniques require the cleanup of the softened mass of resin. This cleanup, after the resin is heated, presents difficulties.

It is therefore an object of my invention to provide an improved method of delaminating laminated glass structures. Further, it is an object of my invention to provide an improved method of removing glass caps bonded to the faceplate of cathode ray tube bulbs without destroying the evacuated condition of the tube.

According to the invention an exposed lamina of laminated glass structure bonded together with an interlayer of resilient material is removed by erosion by sandblasting the exposed lamina to pulverize it.

In the case of delaminating or decapping laminated cathode ray tube bulbs of the type described above, portions of the bulb adjacently surrounding the cap are first masked to expose only the cap. At least portions of the cap are then pulverized by flowing or blowing abrasive particles against the cap, i.e., the cap is sandblasted away. The thus exposed interlayer of resin which remains can be removed by any suitable method, such as by stripping with a solvent or peeling.

The term "sandblasting" as used herein comprises the flowing or blowing of abrasive particles onto or against the article being sandblasted. The abrasive particles need not comprise sand per se, but, in fact, may include any of the known abrasive materials suitable for the purpose, such as aluminum oxide, sand, or steel. Likewise, the flowing or blowing need not be in a medium of compressed air but may involve any suitable gas or even suitable liquids known in the art.

In describing the interlayer of bonding material as being resilient material, the term "resilient" is used to define a rubber-like quality as opposed, for example to resiliency as manifest in spring steel.

In the drawing the single figure illustrates a conventional laminated cathode ray tube bulb in perspective cross section disposed in a masking structure, all of which is contained in the work chamber of a sandblasting unit.

In the drawing the tube 10, which is to be delaminated, comprises a conventional bulb 11 including a neck section 12, a funnel section 14 in which the electron gun (not shown) is mounted, and a faceplate 16. A suitable phosphor screen 18 is provided on the internal surface of the faceplate 16. According to known laminating techniques, a glass cap 20 is provided which has an internal contour substantially mating with the external contour of the faceplate 16. The cap 20 is bonded to the faceplate 16 by an interlayer 22 of a resilient bonding material such as a polymerized epoxy resin. Other suitable resin bonding materials are known in the art.

In the practice of my invention, whereby the cap 20 is to be removed from the bulb 11, the tube 10 is positioned in a masking housing 24 which, together with the tube 10, is placed in the work chamber of a sandblasting unit 26.

The masking housing 24, which may be a box-shaped member, is provided with an opening in a surface 25 thereof, of such size and shape as to receive the tube 10 as shown. In its received position, the tube 10 is placed neck down into the opening of the masking box 24 so that the cap 20 rests on the surface 25 around the opening therein. The masking box or housing 24 preferably comprises a rigid structure 28 having a protective coating 30 of resilient material thereon. The rigid structure 28 may, for example, be wood or steel. The resilient coating 30 may, for example, be plastic or rubber. The resilient protective coating 30 extends at least over the surface 25 of the box 24 and surrounds the opening therein so that the peripheral edge of the cap 20, when the tube 10 is in its received position, rests on the resilient coating 30. Thus, an effective masking seal is provided between the resilient coating 30 and the cap 20 which effectively masks or shields all of the neck and funnel portions 12 and 14 of the bulb 10.

It will be appreciated that the neck and funnel portions 12 and 14 of the bulb 11 can be suitably masked by means other than the rigid box 24 shown. For example, a wrapping or coating of resilient masking material may be applied to the neck and funnel of the bulb.

The masking box 24 together with the laminated tube 10 is disposed in the work chamber of the sandblaster 26. The sandblaster 26 is conventional and comprises a closed work chamber 32 having a suitable sandblasting nozzle 34 disposed therein. The nozzle 34 is connected to an abrasive-supply hose 36 and to an air pressure hose 38. Abrasive particles fed through the hose 36 and compressed air fed through the hose 38 are mixed in the nozzle 34 and blown therefrom according to well-known operational principles of sandblasting practices.

The tube 10 is seated in the masking box 24 so that only the glass cap 20 is exposed. Abrasive particles are then blown from the nozzle 34 and upon the cap 20. The flow of abrasive particles is indicated by the dashed lines 40. The nozzle 34 is preferably of the fan type so that a considerable portion of the cap 20 is subjected to the flow 40 of abrasive particles.

To erode the cap 20 by pulverization thereof, the nozzle 34 is moved back and forth over the surface of the cap 20 as indicated by the arrows 42. I have found by experience that with a fan-type nozzle 34, as illustrated, the front portion 44 of the cap 20 can be completely pulverized and thus removed down to the interlayer 22 of bonding material by four single passes thereover by the nozzle 34. I have, in fact, successfully completely pulverized the front portion 44 of a conventional 250 mil thick cap 20 on a commercial 23 inch 23CP4 type kinescope within four minutes using a commercially available large particle aluminum oxide grit blown with compressed air at a pressure of approximately 80 p.s.i. Accurate control of the erosive action may be obtained either by stationary multiple sandblasting heads properly placed or by providing means for moving the sandblasting nozzle or nozzles relative to the tube as illustrated.

Although the entire cap 20 may be eroded away by pulverizing by the sandblasting, I have found it expedient to pulverize only the front portion 44 thereof and leave the side portion 46. The side portion 46 can then be easily removed after fracturing it, e.g., by tapping with a suitable hammer-type tool.

In accordance with my invention, the cap 20 is subjected to the abrasive action of the sandblasting until at least the entire front portion 44 is completely pulverized and thus eroded away down to the interlayer 22 of resilient bonding material. Although the interlayer 22 may be no more than 60 mils thick, it has surprisingly proved to be completely effective in preventing any erosion damage to the faceplate 16. Moreover, by virtue of the seal between the side portion 46 of the cap 20 and the resilient protective coating 30 on the masking box 24, the funnel and neck portions 14 and 12 of the bulb 10 are also completely protected from any abrasive action of the sandblasting.

The bonding interlayer 22 of resilient material probably is effective to protect the faceplate 16 from the sandblasting by virtue of its rubber-like resilience. Such resilience results in a much greater resistance to the abrasive erosion of the sandblasting than is exhibited by the glass cap 20.

As previously mentioned, one suitable material used for the bonding interlayer 22 is epoxy resin. This and other materials of similar resiliency are thus suitable for providing the necessary protection for the faceplate 16. In fact, suitable bonding materials which might have substantially less rubber-like resiliency than epoxy resin may be used so long as they are sufficiently resilient to resist abrasive wearing away by sandblasting.

What is claimed is:
1. The method of delaminating a laminated electron tube envelope, said envelope including a glass cap bonded to the surface of a glass bulb by an interlayer of polymerized resin, said method comprising the steps of fitting an apertured mask over said envelope to expose only said cap through the aperture thereof and to thereby mask the portions of said bulb adjacently surrounding said cap, pulverizing at least a portion of said cap by blowing abrasive particles thereon and removing said interlayer of polymerized resin from said bulb.

2. The method of delaminating a laminated cathode ray tube, said tube including a bulb having a neck portion, a funnel portion, and a faceplate portion, and a glass cap bonded to the external surface of said faceplate portion by an interlayer of resilient polymerized resin, said cap including a relatively flat front portion overlying said faceplate and a surrounding side portion formed as a short hollow cylindrical section integral with said front portion, said method comprising the steps of: masking said bulb so as to expose only said cap and so as to shield said neck and funnel portions, eroding away said front portion of said cap by sandblast blowing abrasive particles thereupon to pulverize it, then fracturing the remaining said side portion of said cap to remove said side portion from said bulb, and removing said interlayer of polymerized resin from said bulb.

References Cited in the file of this patent

UNITED STATES PATENTS 2,555,077    Fuller _____ May 29, 1951